United States Patent [19]

Bears

[11] Patent Number: 5,325,223
[45] Date of Patent: Jun. 28, 1994

[54] FIBER OPTIC TELEPHONE LOOP NETWORK

[75] Inventor: James A. Bears, Osgoode, Canada

[73] Assignee: Northern Telecom Limited, Montreal, Canada

[21] Appl. No.: 810,067

[22] Filed: Dec. 19, 1991

[51] Int. Cl.$^5$ .................... H04J 14/00; H04B 10/12
[52] U.S. Cl. .................... 359/137; 359/125; 348/6
[58] Field of Search ............... 359/118, 119, 121, 126, 359/137, 125, 117; 358/84, 86; 455/3.1, 4.1, 4.2, 5.1

[56] References Cited

U.S. PATENT DOCUMENTS

| 4,491,983 | 1/1985 | Pinnow | 359/118 |
| 4,686,667 | 8/1987 | Ohnsorge | 359/118 |
| 4,709,418 | 11/1987 | Fox | 359/118 |
| 4,891,694 | 1/1990 | Way | 359/125 |
| 5,136,411 | 8/1992 | Paik | 359/125 |

FOREIGN PATENT DOCUMENTS 9109478 6/1991 PCT Int'l Appl. .............. 359/125

OTHER PUBLICATIONS

M. Shimoidara et al, "Optical Technology for ISDN User Access", NEC Research & Development, Special Issue on ISDN, 1987, pp. 68–77.
R. A. Schiffler et al, "An Alternative Interim Solution on the Road to BISDN", Conf.Record, IEEE Int'l Conf.on Communications, Apr. 14–19, 1990, vol.4, pp. 1–4.
T. Hasegawa et al, "Optical Customer Access Based on Digital Loop Carrier", Conf. Record, IEEE Int'l Conf.on Communications, Apr. 14–19, 1990, vol.4, pp. 1550–1554.
J. D. Jensen et al, "Fiber to the Pedestal . . . Then What?", Conf.Record, IEEE Int'l Conf.on Communications, Apr. 15–19, 1990, vol.4, pp. 32–34.
S. Pendleton-Hughes et al, "Forty Channel Wavelength Multiplexing for Short Haul Wideband Communication Networks", Tech.Digest, 11th European Conf. On Optical Communication, Oct. 1–4, 1985, vol.1, pp. 649–652.
L. Bersiner et al, "Bidirectional WDM Transmission with Spectrum Sliced LEDs", Journal of Optical Communications, vol.11, No.2, Jun. 1990, entire document.
"What Cost Local Loop?", C. Nelson, Telephony, Oct. 29, 1990, pp. 38–42.
"Break on Through to the Other Side", C. T. Hawley, Telephony, Jan. 14, 1991, pp. 38–48.
"To PON or Not to PON? That is the Question", J. S. McConnell, Telephony, Jan. 14, 1991, pp. 50–56.
Hightower, "Economic FO System for New Residential Services", Telephony Mar. 17, 1986 pp. 44–56.

Primary Examiner—Leslie Pascal
Attorney, Agent, or Firm—Yoshiharu Toyooka

[57] ABSTRACT

Novel fiber optic telephone loop networks are disclosed. In the networks, single mode fiber optics are used for feeder and distribution segments of the loop but multimode fiber optics are used for the drops. The use of the multimode fiber optics has permitted the use of less costly optoelectronic devices. Surface light emitting diodes are such economical but reliable parts. Fiber service terminals located near customer homes convert single mode operation to the multimode operation. The networks are relatively easy to install and upgrade and are very economically competitive with other known FTTC and FTTH schemes.

2 Claims, 5 Drawing Sheets

FIBER OPTIC TELEPHONE LOOP NETWORK

FIELD OF THE INVENTION

The present invention is directed generally to a novel telephone loop network. In particular, it is directed to a telephone loop network in which single mode optic fibers and multimode optic fibers are used at specific segments of the telephone loop. Together with the use of more economical outside plant elements, the invention realizes a cost effective fiber-in-the-loop deployment which also possesses a good future upgrading capability of the communication services.

BACKGROUND OF THE INVENTION

The fiber optic transmission technology has matured from its embryonic field trial status to the position of market where now it is dominates in the long-haul transmission arena. The fiber optic has recently penetrated into the feeder portion of the local loop. This technological evolution is continuing into the distribution portion of the loop and then further into the drops to individual homes. The primary reason for this change is that fiber optics has become the most economical way to meet customer needs.

As discussed in "What Cost Local Loop?" by C. Nelson in Telephony, Oct. 29, 1990, pp 38-42, there are many factors to consider when comparing the economics of copper and fiber in the loop. Although the installed first cost of fully loaded systems is probably the single most visible factor, other variables such as depreciation, maintenance costs and the ability to provide service to initial residents—while deferring the cost of providing service to future residents—can have major effects on the economics of the competing systems. These life-cycle costs are the most difficult to analyze because they vary so dramatically based on the specifics of the neighbourhood under consideration.

The telephone companies at the same time must face another problem of providing cost-effective POTS (plain old telephone service) today using a system that will be able to carry tomorrow's enhanced services. Any FITL (fiber-in-the-loop) system deployed today must have this capability. Thus Bellcore (Bell Communications Research Inc.) lists the three key requirements of such a system. First, it must have only two fibers per pedestal. Second, the upgrade plan must provide for the simultaneous transmission of telephony, AM video and broadband integrated services digital network (BISDN) offerings in any mix at the pedestal. Finally, upgrading one subscriber interface unit should not affect customer service at other subscriber interface units.

Single-mode optical fibers are the future of the telephone loop and have been exclusively used in various portions of the loop. They are relatively robust, economical and have bandwidth capacity that far exceeds today's copper pairs. But placing fiber in the loop also presents significant technical challenges for telecommunications equipment suppliers and telephone company planners in the areas of cost, power, operations and architecture. The choices made in each of these areas will affect decisions in the others, which adds to the challenge. (See "Break On Through To The Other Side" by C. T. Hawley, Telephony Jan. 14, 1991, pp 38-48.)

Telephone company planners continue to struggle with the placement of fiber in the distribution plant even though, as stated earlier, fiber optic networks can provide increased bandwidth, superior signal quality, greater immunity to electromagnetic interference and reduced maintenance when compared with their copper-based counterparts. It is discussed in "To PON or Not To PON? That is The Question" by J. S. McConnell, Telephony, Jan. 14, 1991, pp 50-56 that traditional approaches for placing fiber in the distribution plant vs. the copper cable alternative have not proven economically feasible.

In summary, as stated in the article by Hawley, telephone companies need an FITL architecture that supports current services and operations and provides an evolutionary path from a copper-dominated loop to an all-fiber loop. It must lead to the deployment of fiber in a way that conserves near-term capital resources and provides a fiber disposition in the loop that will allow a stream of new services to be provided with minimal rearrangements. It must gracefully integrate the loop into a survivable national synchronous optical network. The right architecture will allow the evolution of operations support to new generations of mechanized support systems in an increasingly intelligent and flexible network. The present invention proposes a novel way of integrating fiber network into the loop and achieves these objectives.

OBJECTS OF THE INVENTION

It is therefore an object of the present invention to provide a optic fiber telephone loop network which is economical to implement without disrupting existing services.

It is another object of the present invention to provide a optic fiber telephone loop network which is easier and more economical to upgrade.

SUMMARY OF THE INVENTION

Briefly stated the present invention is directed to a novel telephone loop network which connects a central switching office and a plurality of individual homes. The loop network comprises a remote fiber terminal and a plurality of FST means. The remote fiber terminal is located at the central switching office and includes multiplexer/demultiplexer means for converting electrical signals from the central switch into multiplexed optical signals and vice versa. Each of the FSTs is located substantially near a group of the plurality of homes and includes multiplexer/demultiplexer means for converting the multiplexed optical signal into demultiplexed individual optical home signal and vice versa. The network includes single mode fiber optic feeder cables which connect the remote terminal and the plurality of FST means for transmitting each of the multiplexed optical signals to each of the FST means. The network further has multimode fiber optic drops, each connecting one of the plurality of FST means and one individual of the plurality of homes for transmitting the demultiplexed individual home optical signal to the individual home. House optical terminal means is included in the network and are each located at the individual home and includes an individual line card for converting the demultiplexed individual home optical signal into a home electrical signal and vice versa.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

Figure 1:
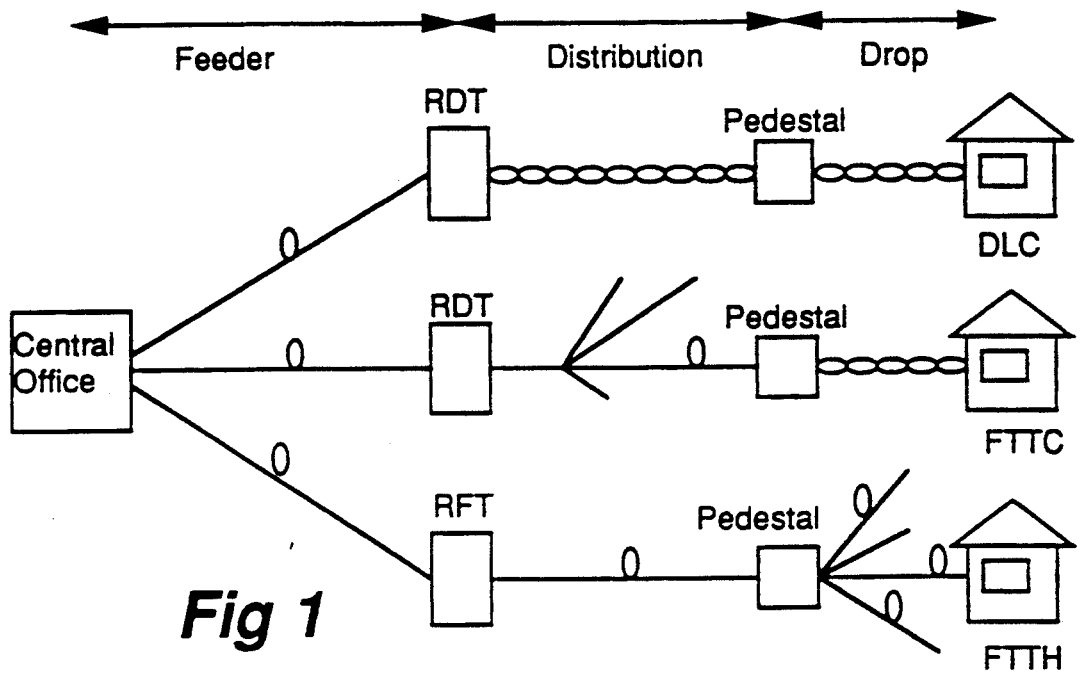
FIG. 1 is a schematic diagram of popular prior art fiber-in-the-loop system architecture.

In FIG. 1, there are shown popular fiber-in-the-loop system architectures widely being experimented today.

The digital loop carrier (DLC) system uses electronic multiplexing techniques to share a single mode optical fiber in the feeder portion of the loop. This sharing is often referred to as pair gain. An active remote digital terminal (RDT) converts optical signals to electrical signals. Dedicated copper wires are used only in the distribution and drop segments between which segments is located a passive curb pedestal near a group of individual homes to serve them. No special equipments are needed at the individual homes but the capacity of the copper wires limits the scope of extended services.

The fiber-to-the-curb (FTTC) system in the active double star (ADS) configuration is a further variation of the DLC system and typically uses DLC in the feeder followed by more pair gain electronics for the distribution segment. An RDT may be passive or active. The traditional digital loop carrier-like approach for the FITL is to further place fiber in the distribution segment of the DLC system shown in the Figure. Thus this can be considered as a further evolutional phase from the DLC system. In this case, the RDT is an active terminal forming a DLC system (active optoelectronics). The RDT may now properly be called remote fiber terminal (RFT). Within the DLC system an optical channel unit (OCU) would transmit and receive information from the optical network unit (ONU). The ONU would be located at the curb pedestal near the customer premises and contain various service-related interfaces such as POTS, coin, data or video.

The RDT can be a passive terminal. In this case it contains only single mode fiber splices or splitters etc. but it is a junction between the feeder trunk (generally encased and buried) and the distribution (buried, aerial etc.). Other passive optical splitters may be located on the single mode fiber distribution trunk which ends at an active curb pedestal. The curb pedestal contains optoelectronics and converts optical signals to electrical signals. Dedicated copper wires are used for the drop. The services to individual homes are again limited but future upgrading will be easier to implement than the DLC system.

The fiber-to-the-home (FTTH) system in the passive optical network (PON) configuration uses the pair gain concept but also uses passive optical splitters to eliminate the electronics and optoelectronics at the curb pedestal as well as at the RFT. The same single mode optical fiber extends the pair gain concept to the drop to individual homes. An active optoelectronic terminal is required at each individual home to interface customer's data terminal equipment (DTE).

The article by McConnell referred to earlier concludes that using the traditional approach, every ONU supported would require two sets of optoelectronics (one each at the RFT and ONU) and an individual fiber path between the RFT and ONU. The amount of fiber and optoelectronics required using this architecture makes it difficult to achieve cost-parity with copper. The PON architecture, on the other hand, addresses the economic use of deploying FITL systems by sharing fibers and electronics among a number of subscribers. This is accomplished using a time division multiple access (TDMA) protocol that allows the payloads of multiple ONUs to be transmitted over a single pair of fibers. To separate the combined payloads, passive optical splitters are used.

Figure 2:
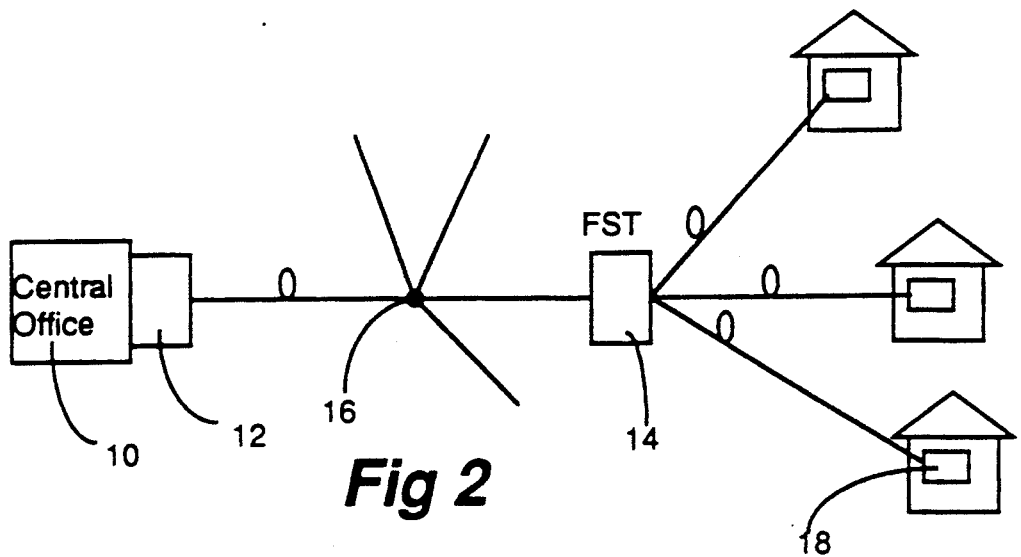
FIG. 2 is a schematic diagram of a novel loop network according to the present invention.

FIG. 2 illustrates the present invention according to one embodiment. In the Figure, a central office 10 contains a remote fiber terminal 12 in its premise instead of being away from the switching equipment. The remote terminal includes all the necessary electronics for optical transmission to curb pedestals 14 which are called fiber service terminals (FSTS) via single mode optic fiber feeder and distribution of e.g. 150 Mb/s. No active equipments are located on the single mode fiber feeder but one or more passive splitters 16 and/or feeder splices can be provided at the junction between the feeder and the distribution or at any point on the distribution segment to accomplish a necessary configuration. The FSTs are active pedestal which contains multiplexer/demultiplexer, optical transmitter/receivers and etc. The drop from the FST to an individual home is a multimode fiber optic e.g. of 40 Mb/s which terminates at a house optical terminal 18 (HOT) located at a customer's premise. Each FST serves for example 16 HOTS.

Figure 3:
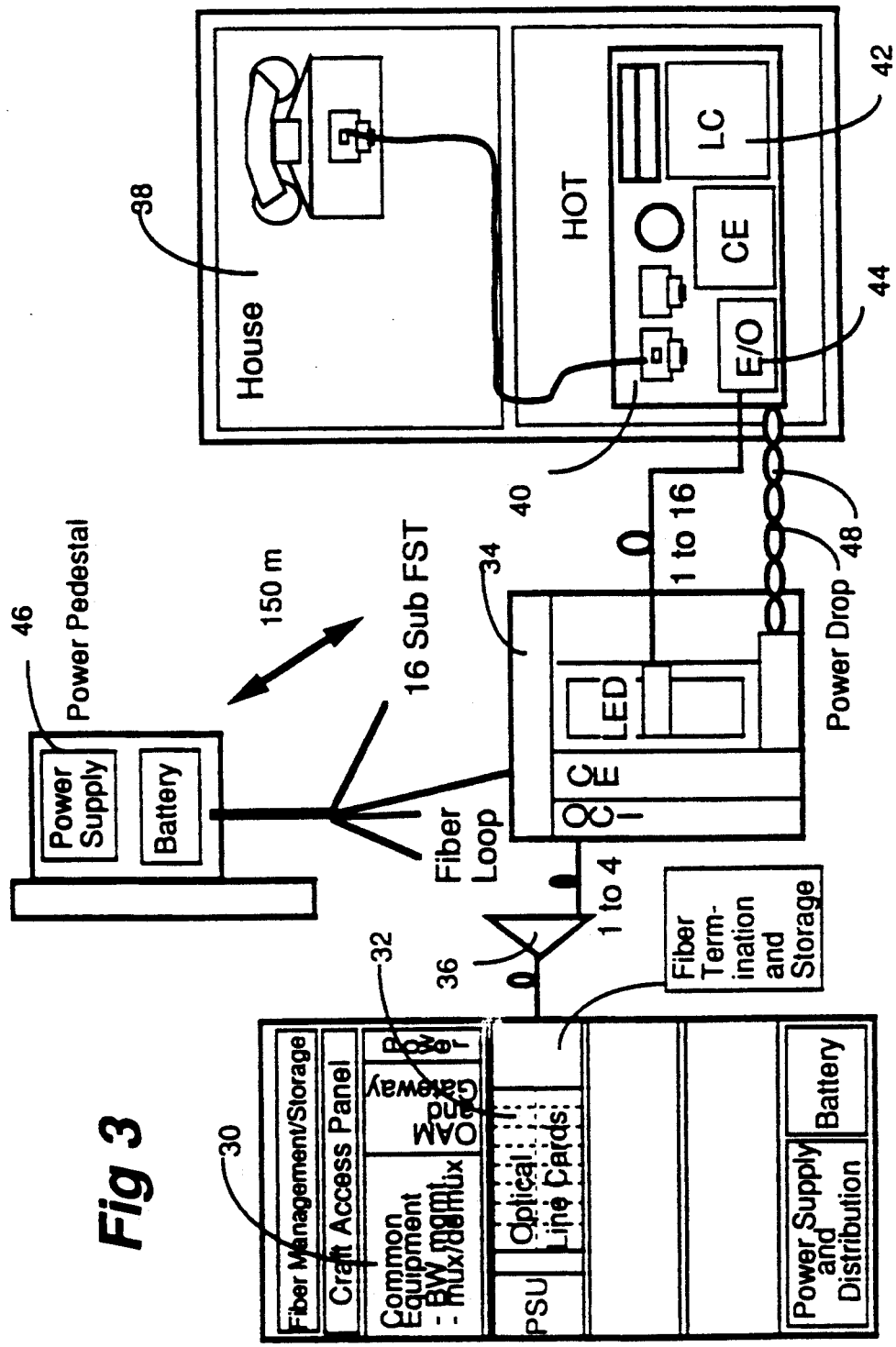
FIG. 3 is a functional diagram of the various components of the loop network.

FIG. 3 is a functional diagram of the present invention. The switching equipment 30 in the central office sends out multiplexed electrical signals. In the direction from the central office to the individual home, the electrical signals are first converted to multiplexed optical signals at the remote fiber terminal (RFT) 32 built in the central office premise and sent to the FST 34 over the single mode optic fiber feeder cable. In some embodiments, 1:n passive splitters 36 (n=1-4) divide the optical signals into each FST. FSTs are located reasonably near the individual homes 38, generally at similar locations as curb side pedestal in the known architectures. An FST demultiplexes the optical signals to a plurality of individual home optical signals and sends them over multimode fiber optic drops to house optical terminals 40 located at individual homes. As the FSTs are located near the individual homes and multimode fibers can be uninterrupted, conventional copper pedestals and fiber splice pedestals which are required near the homes in the known architectures can be eliminated. Each of the house optical terminals includes an individual line card 42 and an E/O (electric/optic) converter 44 to convert an individual home optical signal to a home electrical signal. As the FSTs and the house optical terminals are active devices, they require electric power to operate. A power pedestal 46 is provided for this purpose at or near the FST and connects it with the commercial hydro lines. An emergency battery pack is housed in the pedestal. A pair of copper wires 48 between the FST and the individual home supply the needed electrical power to the house optical terminal. A power pedestal may serve one or more FSTs (e.g. 16).

Figure 4:
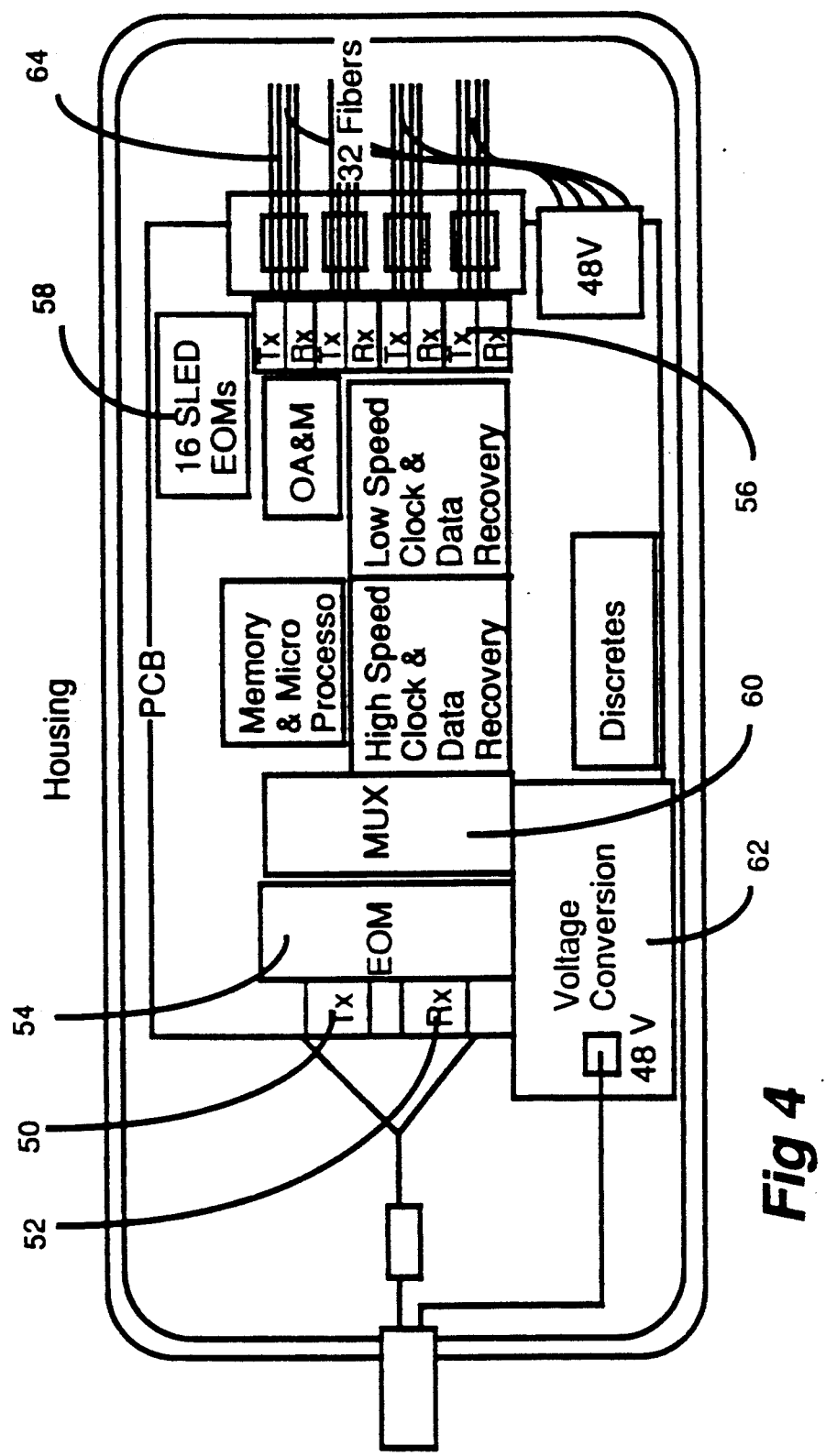
FIG. 4 is a functional diagram of the fiber service terminal according to the invention.

FIG. 4 shows an FST. In the Figure it is shown that an FST includes an optical transmitter 50, an optical receiver 52 and an E/O module 54 on the feeder side. A plurality of optical receivers, transmitters 56 and E/O modules 58 are provided on the drop side and a multiplexer/demultiplexer together 60 with its associated components such as a microprocessor and clock and data recovery circuits interconnect the E/O modules at the both sides. In addition, voltage converter circuits 62 for provisioning the proper power from the hydro lines are also housed in the FST. 16 pairs of multimode optic fibers 64 (32 fibers) serve as drops for 16 homes. Each pair is provided with an optical transmitter and an optical receiver. Each fiber of a pair is used for transmitting signals in each direction. The optical transmitters use surface LEDs which are optically coupled to each of the drop fibers. In the known architectures, single mode optic fibers are used because they are more efficient in transmitting optical signals due to their low absorption loss. However they require more accurate alignment between the light source and the fiber core. It is generally accepted that a laser source must be used as the light source. It should also be mentioned that a single mode fiber carrying an intense light is not welcome to customer home where inadvertent handling of the fiber may result in the handlers eye damage. The multimode fibers, on the other hand, have a higher absorption loss but permit the use of other kinds of light sources such as light emitting diodes etc. because they do not require as accurate alignment as the single mode fibers. The surface light emitting diodes (SLED) are less costly than lasers but very acceptable light source for this purpose. In one embodiment, 16 pairs of copper wires are also run along the drops for supplying the power to the house optical terminals.

Figure 5:
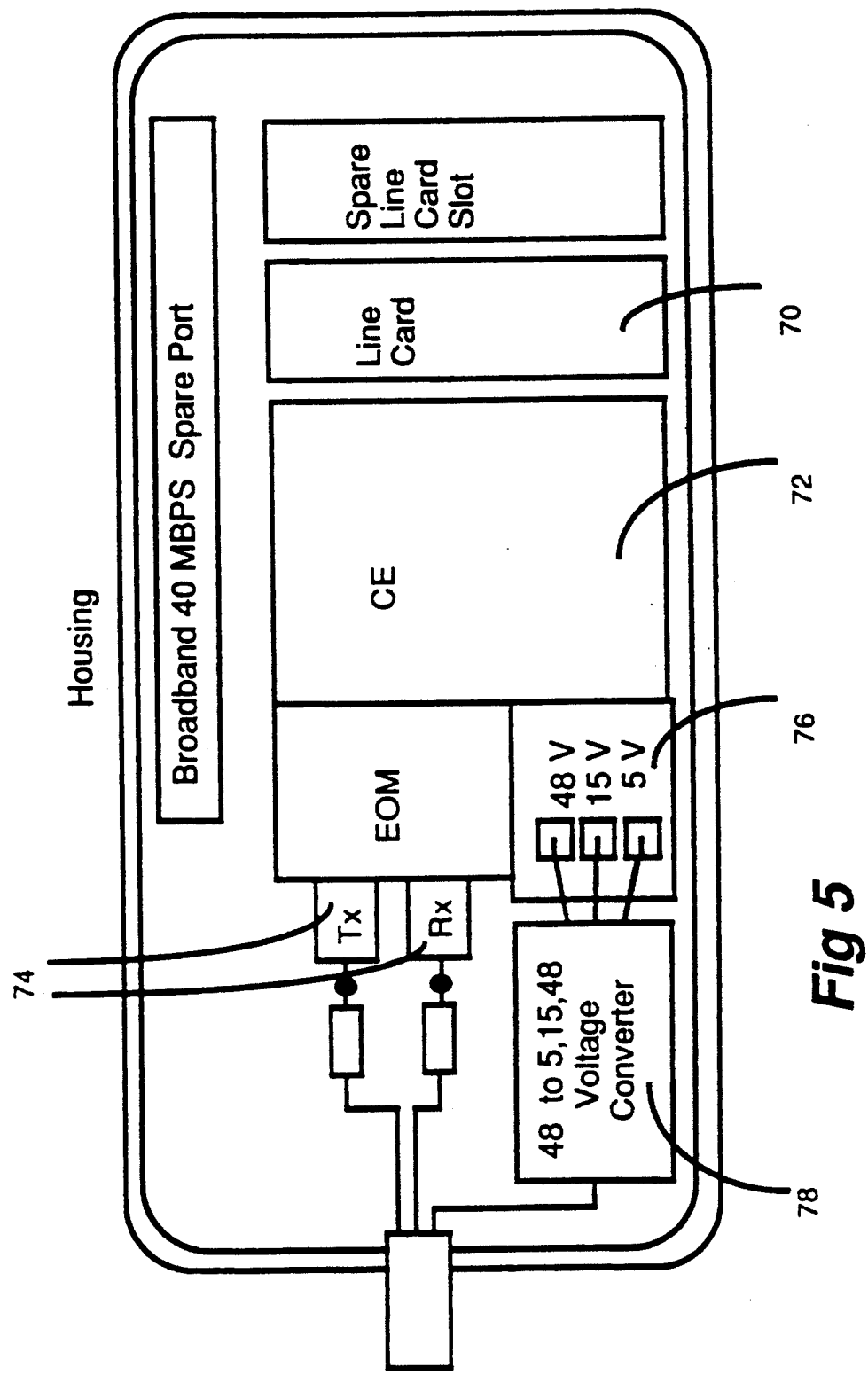
FIG. 5 is a functional diagram of the house optical terminal according to the invention.

In FIG. 5, the house optical terminal is shown to contain a line card 70 which interfaces customer communication terminals with CE 72. An optical transmitter and receiver 74 such as those similar to ones located at FST are attached at the home end of the drop and an E/O module 76 connects the CE and the transmitter/receiver. A voltage converter 78 is included in this terminal for supplying the proper power sent through the power copper wires to the components. In certain embodiments, a drop may include more than one multimode fiber pair and a HOT contains one or more SLED coupled to the fibers, depending upon the required bandwidth.

Figure 6:
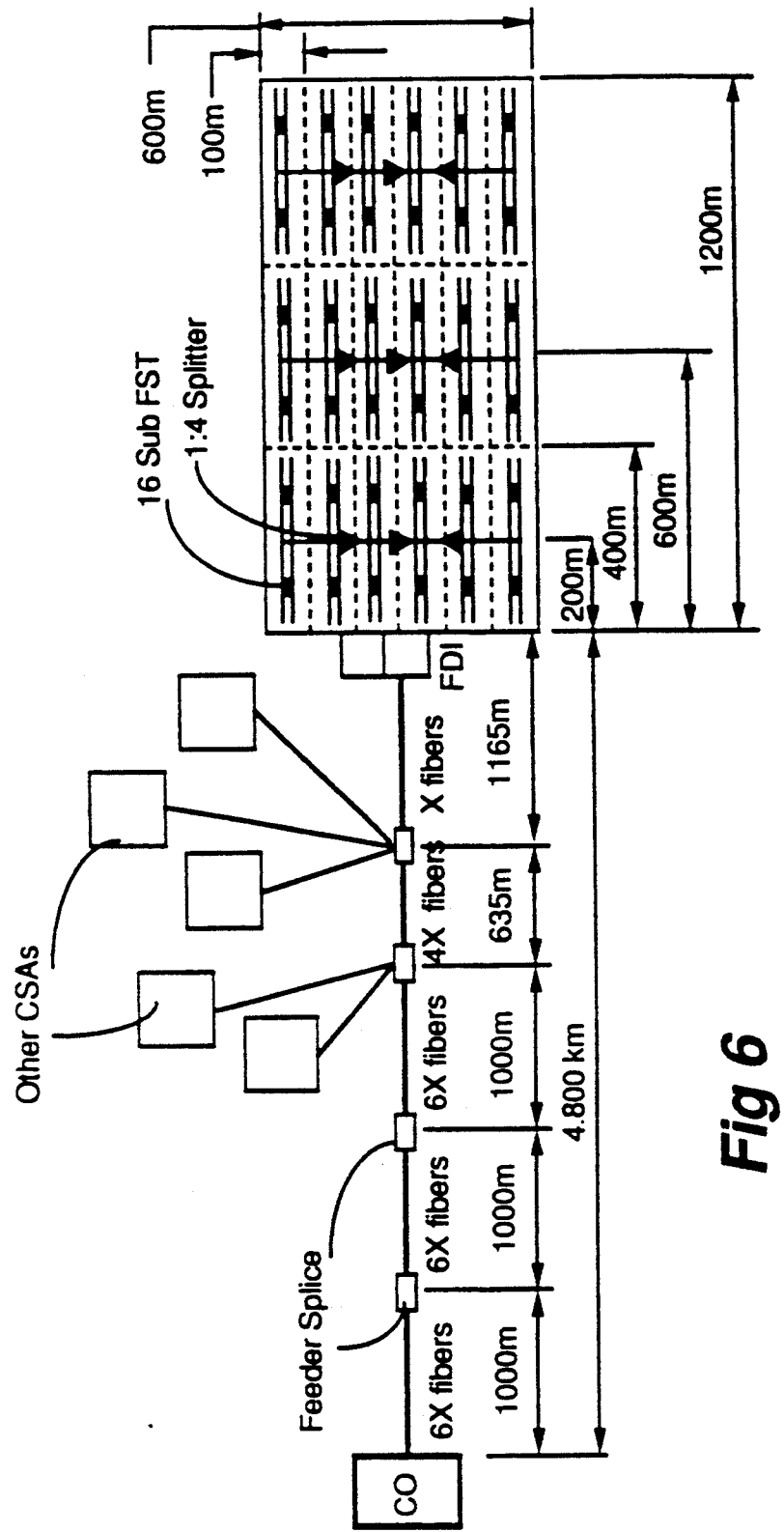
FIG. 6 is a layout showing a configuration of a carrier service area according to the invention.

In FIG. 6, the present invention is applied to a typical subdivision of a residential area. In the telephone environment it is called a carrier serving area (CSA). The figure also illustrates passive feeder splices as well as passive optical splitters from which separate CSAs are branched off. As shown in the Figure, each CSA contains many FST (e.g. 16) and 1:4 splitters. A fiber distribution interface (FDI) at the entrance of the CSA is a passive equipment used as a line management location by the telephone company for repair, upgrading etc. The FDI may in another embodiment integrate a group of passive optical splitters.

According to the present invention, the RFT is integrated into the central office premise and this accomplishes increased fill on peripheral equipment i.e. more lines available to fill shelves, consolidate functionality of transport and access nodes and save cost on outside plant cabinet or CEV (common equipment vault). Small split ratio passive splitters used in the feeder/distribution segment result in reduction of fiber cost in feeder and part of CSA and central office peripheral ports, while the small split ratio will not increase EOM cost for less than 60 Mb/s. FSTs are located within reach of many individual homes and regular curb pedestals can be eliminated. Many FSTs sharing a power pedestal lower the cost and increase adaptability for future growth. The FST only contains shared equipment and because of the multimode fibers economical optoelectronics are used. No linecards are housed in the FST and subscriber lines can be installed as they are demanded. The FSTs can thus much be reduced in size. The FST utilization will improve because no linecard slot sparing is required for potential further line growth as additional linecards can be much more easily and economically accommodated at the HOT. In combination of FSTs and HOTs fault sectionalization can be more easily achieved. The HOT uses SLED and multimode drop, realizing the broadband capability immediately available for requested customers. However at the same time only one POTS line can be provided to certain homes and additional services can be easily added at very low cost if demanded later using one or more spare linecard slots on the HOT.

According to the inventors comparative analyses using generic architecture models, the present invention is more costly in installation than copper wire scheme but is very competitive with the FTTC and PON. However, when considering the cumulative cost of future growth for services, the present architecture shows advantages over other FTTC and PON or even over the copper scheme.

I claim:

1. A cost optimized digital telephone loop network connecting a switch in a central switching office and a plurality of individual homes, comprising:

a remote fiber terminal located at said central switching office and including multiplexer/demultiplexer means for converting electrical signals from the switch into multiplexed digital optical signals and vice versa;

between one to sixteen fiber service terminal means, each located substantially near a group of said plurality of homes, each of said fiber service terminal means including multiplexer/demultiplexer means for converting said multiplexed optical signals into demultiplexed individual optical home signals and vice versa and a plurality of surface light emitting diodes for transmitting said individual optical signal to and from said plurality of homes;

single mode fiber optic feeder cables connecting said remote terminal and plurality of fiber service terminal means for transmitting said multiplexed optical signals into said fiber service terminal means;

a small number of passive optical splitter/combiner means on any of the single mode fiber optic feeder cables for splitting and combining said multiplexed optical signals to and from said plurality of fiber service terminal means, the split rate of each splitter/combiner means being less than one-to-four;

a plurality of pairs of multimode fiber optic drops, each pair optically connecting one of said plurality of fiber service terminal means and one individual home of said plurality of homes, by way of said plurality of surface light emitting diodes, one drop within each pair being for transmitting said demultiplexed individual home optical signal to said individual home and the other drop of the pair being for receiving individual home optical signal from said individual home;

house optical terminal means, each located at said individual home and including an individual line card which contains a surface light emitting diode for converting said demultiplexed individual home optical signal into a home electrical signal and vice versa, and electrical drops, each connecting a fiber service terminal means and said individual home for supplying the electrical power to its house optical terminal means.

2. The cost optimized digital telephone loop network connecting a switch in a central switching office and a plurality of individual homes, according to claim 1, further comprising a plurality of power pedestals, each located near said fiber service terminal means and connected to commercial electricity supply network for supplying the electrical power to said fiber service terminal means and including an emergency battery means.

* * * * *